(12) United States Patent
Chessin

(10) Patent No.: US 6,351,848 B1
(45) Date of Patent: *Feb. 26, 2002

(54) UNITARY DATA STRUCTURE SYSTEMS, METHODS, AND COMPUTER PROGRAM PRODUCTS, FOR GLOBAL CONFLICT DETERMINATION

(75) Inventor: Stephen Alan Chessin, Mountain View, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/087,264

(22) Filed: May 29, 1998

(51) Int. Cl.[7] .................................................. G06F 9/45
(52) U.S. Cl. .................................. 717/5; 717/10; 717/7
(58) Field of Search ................................ 395/705, 707, 395/710, 379, 709; 711/147, 206, 210; 707/104.1; 712/244; 714/54

(56) References Cited

U.S. PATENT DOCUMENTS

| | | | | |
|---|---|---|---|---|
| 5,165,038 A | * | 11/1992 | Beard et al. | 711/147 |
| 5,339,431 A | | 8/1994 | Rupp et al. | 717/10 |
| 5,367,651 A | | 11/1994 | Smith et al. | 717/9 |
| 5,375,241 A | * | 12/1994 | Walsh | 709/331 |
| 5,375,242 A | | 12/1994 | Kumar et al. | 717/7 |
| 5,524,255 A | * | 6/1996 | Beard et al. | 395/379 |
| 5,535,391 A | * | 7/1996 | Hejlsberg et al. | 395/709 |
| 5,555,417 A | * | 9/1996 | Odnert et al. | 395/707 |
| 5,613,120 A | * | 3/1997 | Palay et al. | 395/710 |
| 5,630,157 A | * | 5/1997 | Dwyer, III | 712/23 |
| 5,680,622 A | * | 10/1997 | Even | 395/709 |
| 5,784,630 A | * | 7/1998 | Saito et al. | 712/30 |
| 5,822,787 A | * | 10/1998 | Zucker | 711/213 |
| 5,881,308 A | * | 3/1999 | Dwyer, III | 712/23 |
| 5,890,000 A | * | 3/1999 | Aizikowitz et al. | 395/709 |

OTHER PUBLICATIONS

Syck, Dynamic Link Libraries for DOS, Dr. Dobb's Journal, v15, n5, p30(12), May 1990.*
Cooper–Lu, Register Promotion in C Programs (ACM 0–89791–907–6/97/0006 . . . ), Jun. 1997.*
Meneghini–Josephson, Iddq Testing of a 180 MHz HP–PA–RISC Microprocessor with Redundancy Programmed Caches, IEEE, Mar. 1997.*

* cited by examiner

Primary Examiner—Tuan Q. Dam
Assistant Examiner—Hoang-Vu Antony Nguyen-Ba
(74) Attorney, Agent, or Firm—Beyer Weaver & Thomas, LLP (57) ABSTRACT

A system, method and computer program product for compiling a source file and to generate a unitary data structure (UDS) containing information relating to symbols and associated global registers. The UDS permits assessment of symbol conflicts for global registers. The compiler also generates object files from related source files. The object files include the global symbol information relating to particular global registers, to enable diagnosis of conflicts between global symbols and registers.

14 Claims, 12 Drawing Sheets

UNITARY DATA STRUCTURE (UDS)
406

USAGE INFORMATION (UI)
440

INITIALIZATION INFORMATION (II)
441

INITIALIZATION INFORMATION (II)
441

INITIAL VALUE (IV)
460

FLAGS 461

INITIALIZER PRESENCE INDICATION
471

ABSENCE OF NAME 472

UNITARY DATA STRUCTURE SYSTEMS, METHODS, AND COMPUTER PROGRAM PRODUCTS, FOR GLOBAL CONFLICT DETERMINATION

RELATED APPLICATIONS

This application is related to commonly-assigned U.S. patent application Ser. Nos. 09/087,352 and , May 29, 1998, respectively invented by Stephen Chessin, Rod Evans, and Michael Walker; and Stephen Chessin, Rod Evans, and Michael Walker. Each of these related patent applications is hereby expressly referenced, incorporated herein, and made a part hereof.

BACKGROUND OF THE INVENTION

1. Field of the Invention

The field of this invention relates to unitary data structure systems, methods, and computer program products, for global register conflict determination; and more particularly to the indication of global register usage and the detection of usage conflicts in global registers using information contained in a unitary data structure.

2. Description of Related Art

Operational flexibility in computer systems is increased by designating one or more of the computer system registers as global in scope. Local registers, unlike global registers, have a scope limited to the particular module or subroutine. In other words, these registers are used by the entire computer program and not just by particular modules or subroutines. Particular global variables or symbols are used in connection with these global registers.

Software programs are often constructed from individual pieces that are each compiled separately, causing misreferencing and incorrect scoping of variables when global registers are improperly called. The software programs particularly incorporate code from one or more libraries. This library code is compiled separately, compounding the misreferencing and scoping problems which arise. One severe technical problem arises when different portions of a particular program use a certain global register for different variable values. Such different and conflicting usages for the same global register tend to cause incorrect results during program execution, because the wrong variable value will be in the global register at the wrong time.

SUMMARY OF THE INVENTION

According to the present invention, separately compiled software units expressly indicate their global register usage in a unitary data structure which contains information associating and characterizing global registers and variables. The unitary data structure is read by the static and dynamic linkers performing linking operation to detect conflicts of usage incident to compilation. According to one embodiment of the present invention, a unitary data structure (UDS) is established to expressly indicate particular symbol table entries which associate a global symbol with a particular global register. The "name" portion of the UDS, points to a string that contains the name of the symbol, or else contains a NULL pointer to indicate that the register is used for scratch. The "value" portion of the symbol table entry indicates the particular register to which this entry applies.

According to the present invention, a compiler generates UDS entries to indicate how a containing object file uses particular application-reserved global registers. The static linker checks the UDS entries for all object files being combined into a particular target object file to ensure that the global registers referenced by the different source elements are used compatibly. The resulting object file produced includes these UDS entries to indicate the resulting object global register usage. According to the present invention, the static linker warns if any global registers is used in a fashion incompatible with the object being built. According to the present invention, the static linker generates a warning, if a shared object file is being built that uses application-reserved global registers. A similar warning is issued according to the present invention by an archiver, if an archive library is built containing object file that use application-reserved global registers. A dynamic linker according to the present invention checks to ensure that all object files being bound into a selected executable process have compatible uses of application-reserved global registers.

According to the present invention, a system and method for compiling and linking a source file includes a compiler for generating a UDS which associates particular global symbols with corresponding global registers for holding variable information pertaining to global symbols referenced or defined in particular source files. The UDS information is sufficient to enable a linker to resolve class definitions and to perform class relocation operations. The UDS information is included in the object file generated by the compiler according to one embodiment of the present invention. The compiler particularly generates object files such that identification of usage conflicts and performance of relocation operations are delayed until operation of the linker. A linker links the object file with other object files and shared libraries to thereby generate either an executable file or a shared library. The list of other object files and shared libraries may be empty, in which case the linker generates the executable file or shared library from the single object file. The linker uses the information contained in the object file to identify usage conflicts and to perform relocation operations.

DETAILED DESCRIPTION OF THE PREFERRED EMBODIMENT

Figure 1A:
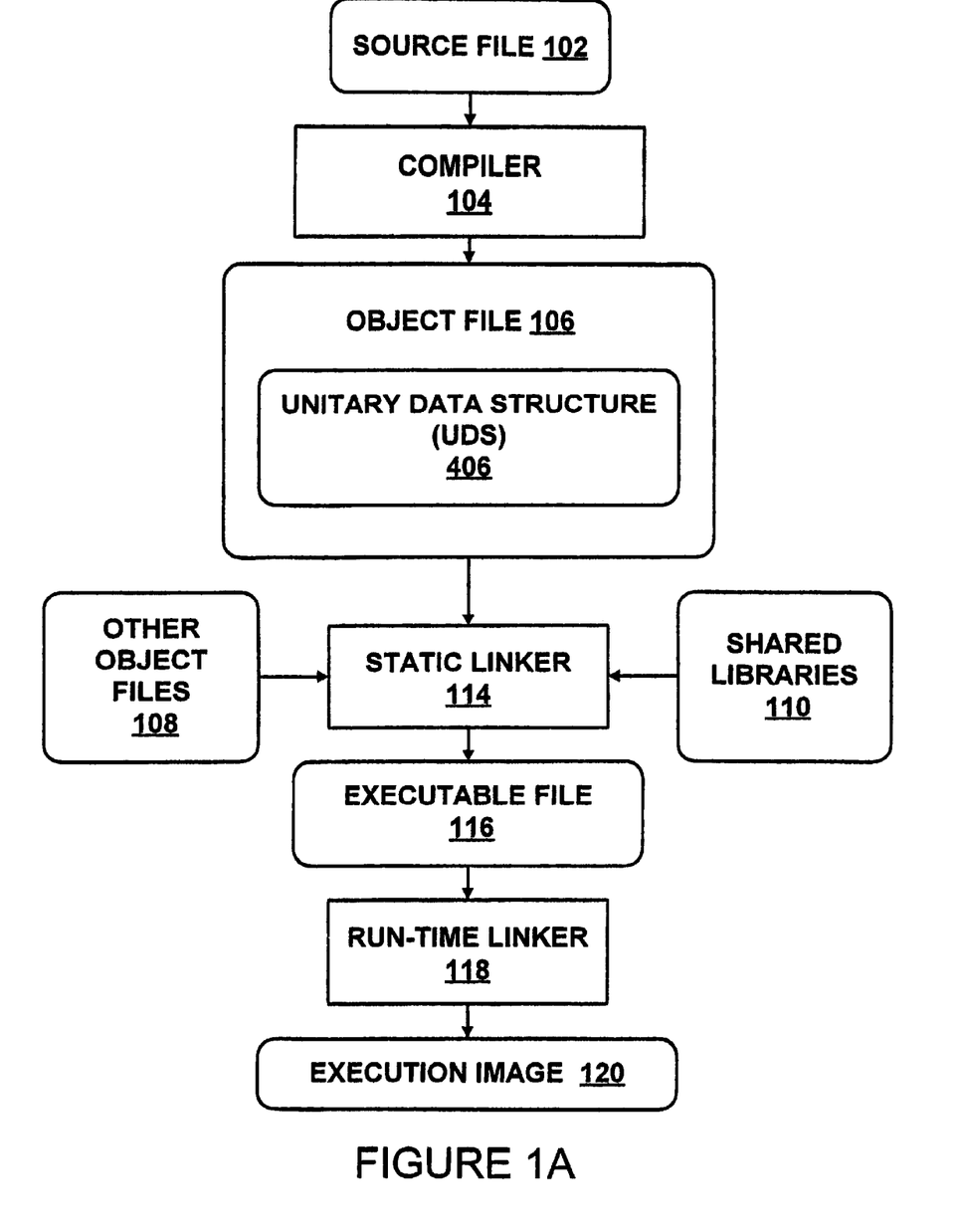
FIG. 1A is a compilation data flow diagram according to a preferred embodiment of the present invention, showing the creation of object files by a compiler which include a unitary data structure (UDS) to enable determination of conflicts between global register assignments by the static and run-time linkers.

FIG. 1A is a compilation data flow diagram according to a preferred embodiment of the present invention, showing the creation of object files by a compiler which include a unitary data structure (UDS) 406 to enable determination of conflicts between global register assignments by the static and run-time linkers. In particular, FIG. 1 illustrates a compiler 104, a static linker 114, and a run-time linker 118, according to one implementation of the present invention. The compiler 104 generates an object file 106 including a UDS 406 according to the present invention, from a source file 102. The source file 102 is written according to different embodiments of the present invention in the wellknown C, C++, or the Fortran computer programming languages. It is important to note that the present invention does not impose restrictions on how developers may use the particular language selected to produce the source file 102. According to one embodiment of the present invention, the static linker 114 includes a relocation code section which is used to initialize register symbols. The UDS 406 according to one embodiment of the present invention has a name, .rela; a type, SHT_RELA; and no attributes, in accordance with the following table:

TABLE A

Matrix of Legal Combinations of Usage of a Given Register

| Name | Type | Attributes |
|------|------|------------|
| .rela | SHT_RELA | None |

.rela sh_link contains the section header index of the associated symbol table; and sh_info is 0, indicating that this section only contains register relocations.

Figure 2:
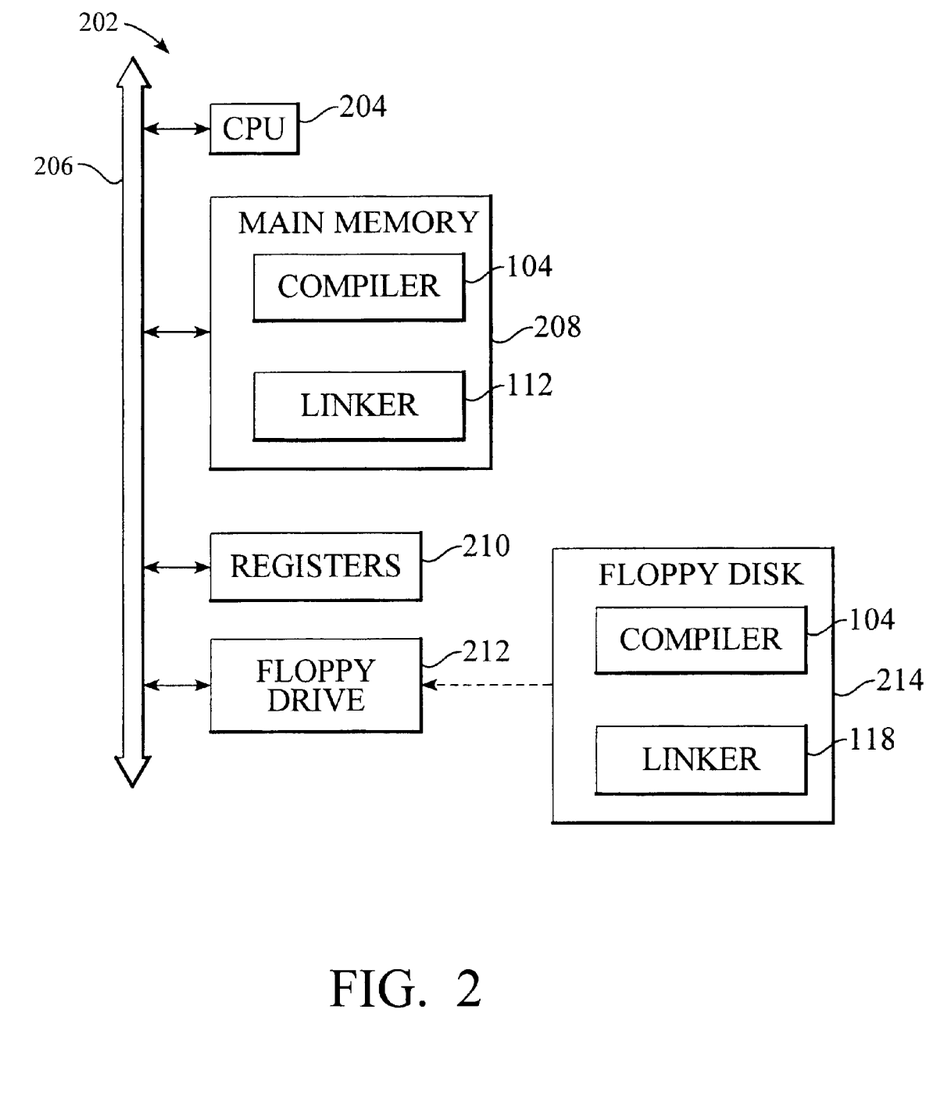
FIG. 2 is a block diagram of a computer system according to a preferred embodiment of the present invention.

The object file 106, as well as zero or more other object files 108, and/or zero or more shared libraries 110 are transferred to a static linker 114, according to the present invention. The other object files 108 were previously compiled by the compiler 104 of the present invention, and the shared libraries 110 were previously created by the static linker 114. The static linker 114 generates an executable file 116 which is secured on a non-volatile medium. The run-time linker 118 on the other hand generates an execution image in main memory which is ready for immediate execution. According to one embodiment of the present invention, the static linker 114 generates another shared library. As will be appreciated, a shared library is a form of an object file. Accordingly, the terms "object file" and "shared library" will be used interchangeably herein. As will be appreciated by persons skilled in the art, the executable file 116 includes code, data, and other information from the object files 106, 108, and also contains references to shared libraries 110 (i.e., code, data, etc. from the shared libraries 110) which are not actually embedded in the executable file 116. During run-time, the executable file 116 and the shared libraries 110 are transferred to a run-time linker 118. The run-time linker 118 then resolves references contained in the executable file 116 to the shared libraries 110, and produces an execution image 120. The execution image 120 is stored in main memory 208 (see FIG. 2) and executed by a central processing unit 204 (FIG. 2). Generally speaking, the operation of the static linker 114 and run-time linker 118 is implemented in four phases, as discussed in detail below.

Figure 1B:
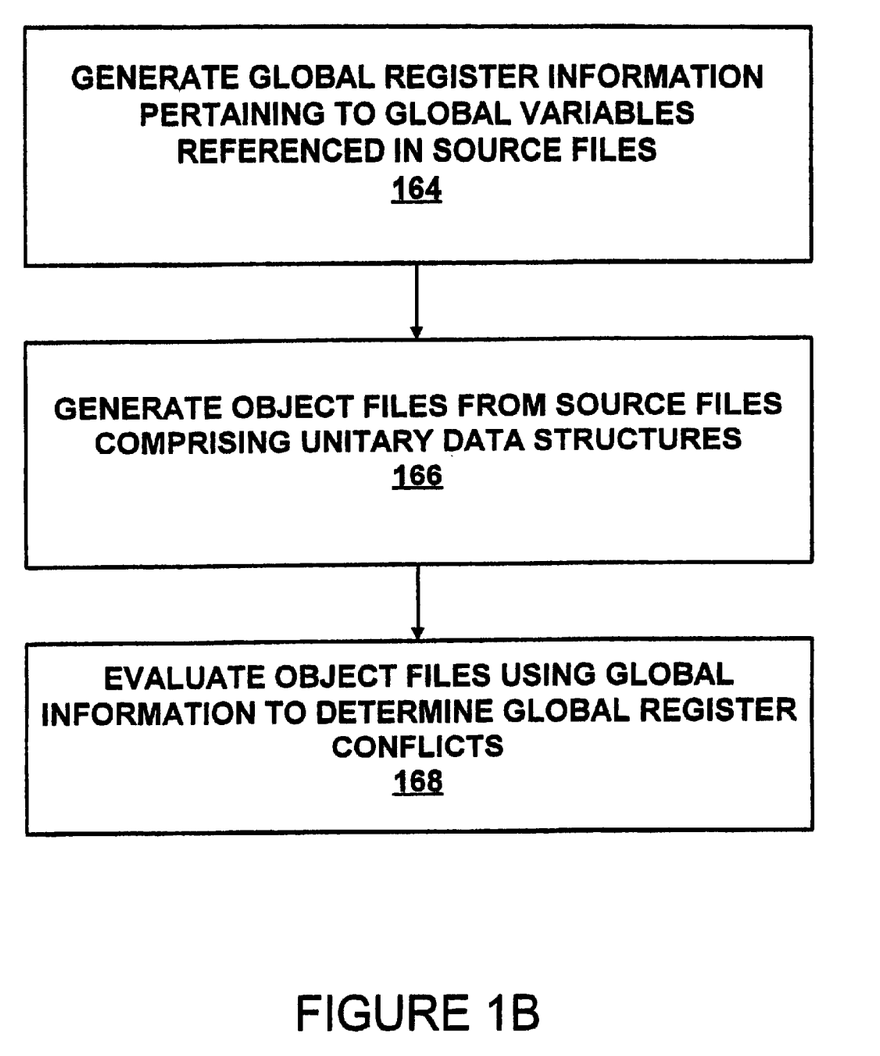
FIG. 1B is a flow chart showing the generation of global information and creation of unitary data structures in object files to enable identification of global conflicts.

FIG. 1B is a flow chart showing the generation of global information and creation of unitary data structures in object files to enable identification of global conflicts. In particular, according to one embodiment of the present invention, global register information pertaining to global variables which are referenced in source files, is generated 164. Then, object files are generated 166 from the source files 102, including unitary data structures which contain the global register information. The object files are then evaluated 168 using the global information to determine whether there are any global register conflicts.

FIG. 2 is a block diagram of a computer system 202 according to a preferred embodiment of the present invention. The computer system 202 includes one or more processors, such as central processing unit (CPU) 204, connected to a communication medium, such as a bus 206. The computer system 202 further includes a main memory (random access memory (RAM)) 208, which is also connected to the bus 206. The computer system 202 further includes a compiler 104 and first and second linkers including a static linker 114 and a run-time linker 118 which are stored in the main memory 208, according to one embodiment. In particular, the source file 102; the object files 106 and 108; the shared libraries 110; and the execution image 120 are also preferably stored in the main memory 208. Computer system 202 further includes a plurality of registers 210 including one or more global registers. According to one embodiment of the present invention, a computer program product (such as disk 214) includes computer readable media having computer program logic recorded thereon according to one embodiment of the present invention. In particular, the computer logic is executed in the computer system 202 to enable the computer system 202 to perform the functions of the present invention. The computer program logic is read by a floppy drive 212 for example. The computer program logic, which represents the compiler 104 and the linkers including static linker 114 and run-time linker 118, may then be loaded into the main memory 208 (as shown), and executed by the CPU 204. A suitable form for the computer system 202 is a Sun Microsystems workstation made by Sun Microsystems, Inc., of Mountain View, California. Any other suitable computer system could alternatively be used.

Figure 3A:
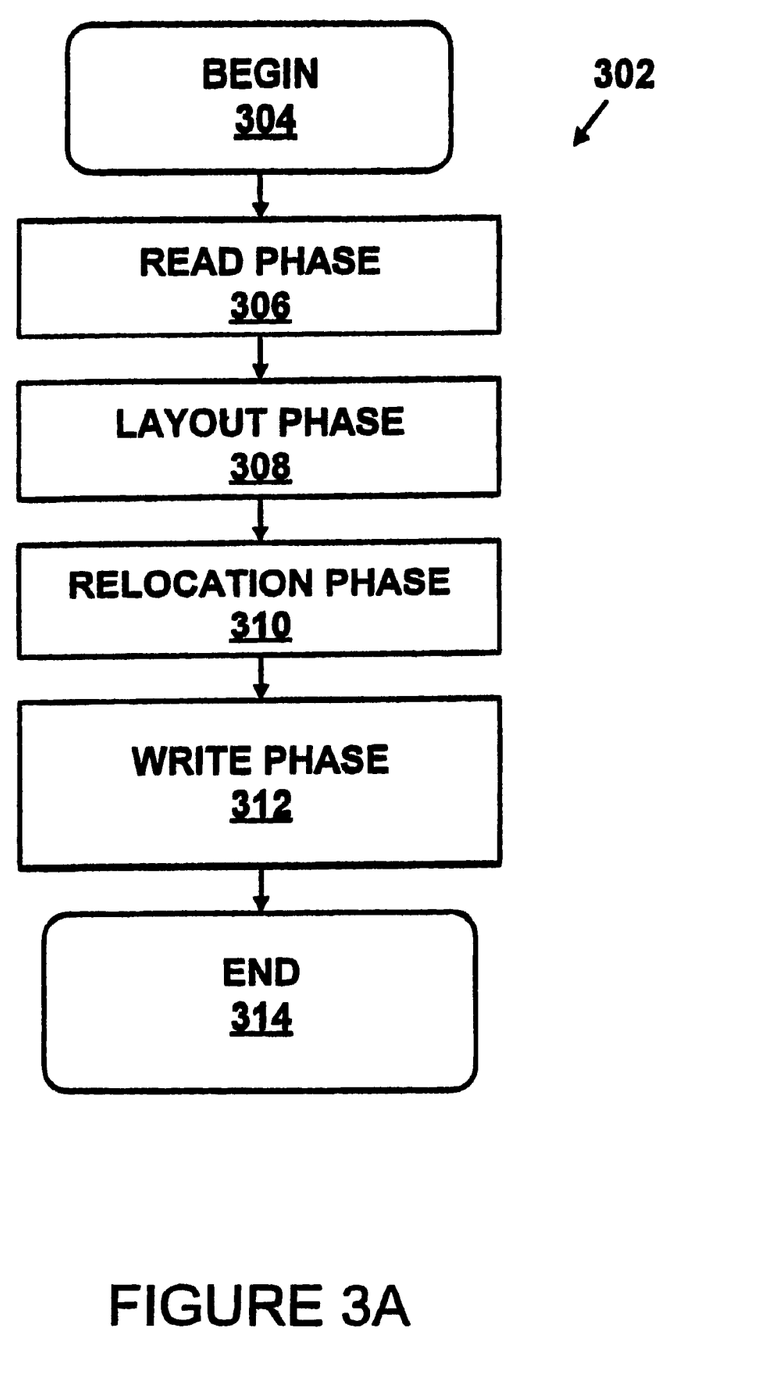
FIG. 3A is a flowchart of a linker process which can be used in connection with the present invention.

FIG. 3A is a flowchart of a linker process which can be used in connection with the present invention. Referring to a flowchart 302 shown in FIG. 3A, the static linker 114 performs a read phase 306, a layout phase 308, a relocation phase 310, andawritephase 312. These linker phases 306, 308, 310, and 312 are performed in connection with the present invention.

Figure 3B:
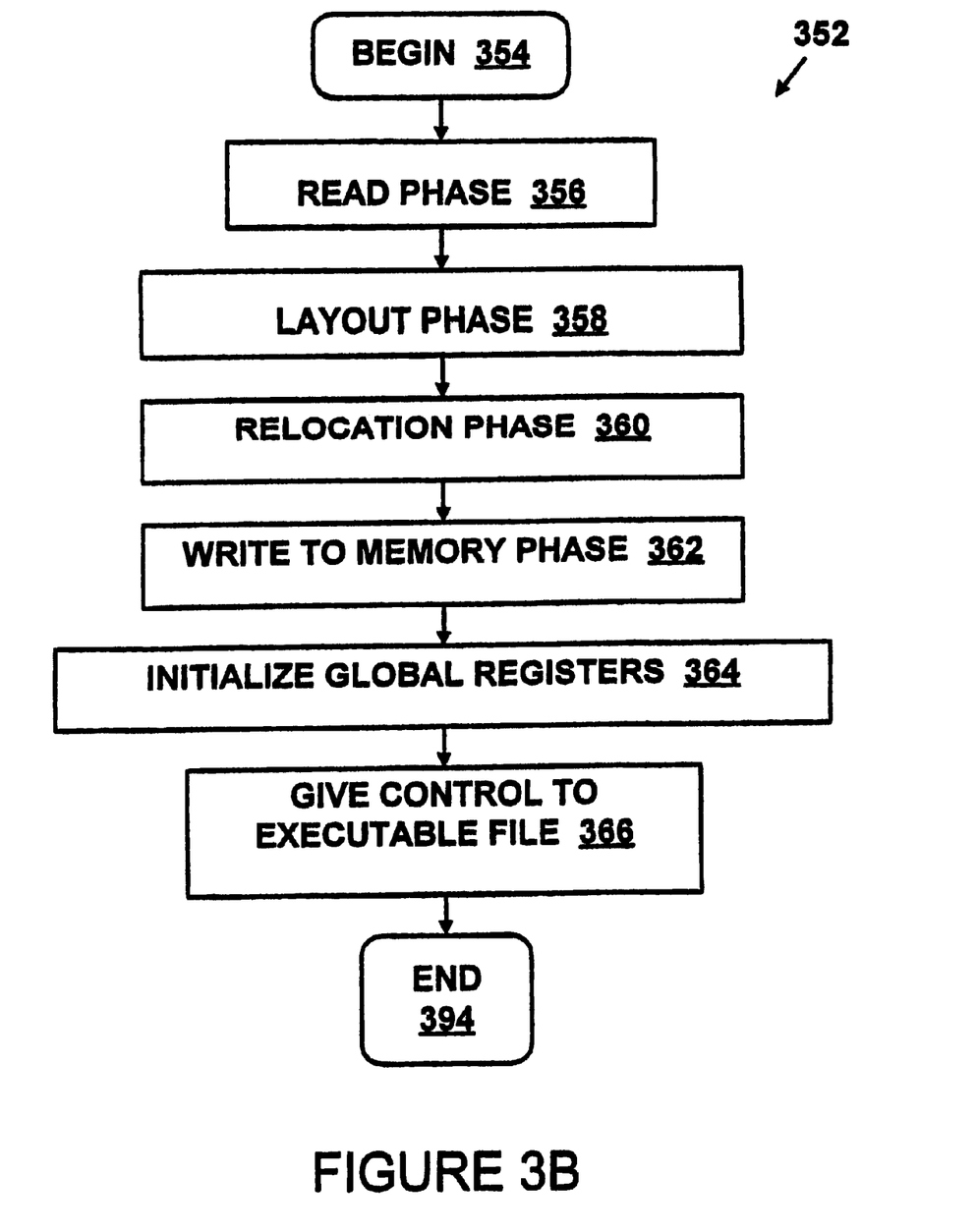
FIG. 3B is a flowchart of a linker process according to one embodiment of the present invention which includes initialization of global registers.

FIG. 3B is a flowchart of a linker process according to one embodiment of the present invention which includes initialization of global registers. In particular, referring to a flowchart 302 shown in FIG. 3B, the run-time linker 118 performs a read phase 306, a layout phase 308, a relocation phase 310, a write to memory phase 312, an initialization of global registers phase 364 according to the present invention, and a give control to the executable file phase 366, followed by a termination or end of execution state 394.

Figure 4A:
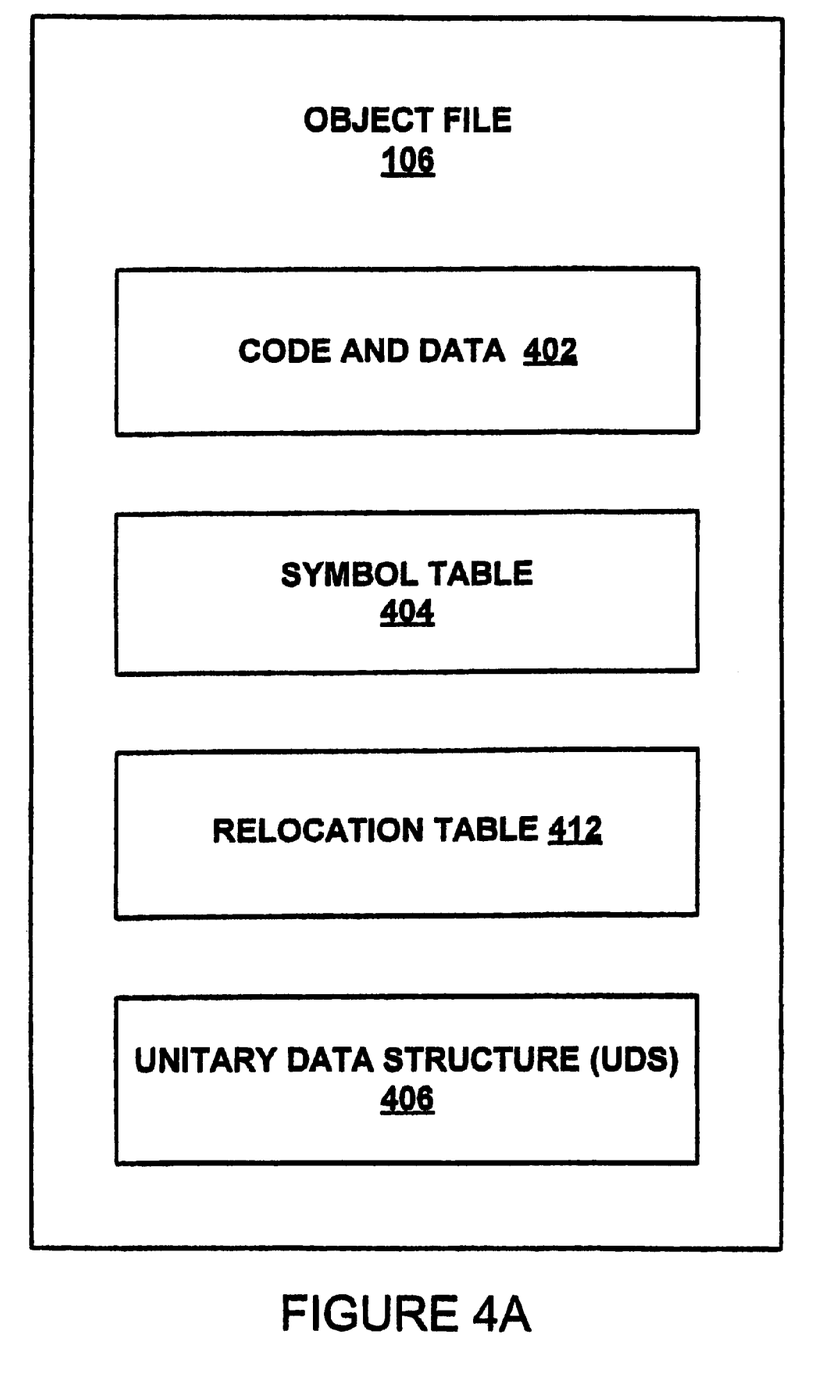
FIG. 4A is a block diagram of an object file produced by a compiler according to a preferred embodiment of the present invention, in which object files are produced by the compiler with a UDS to enable determination of conflicts between global register assignments by the static and run-time linkers.

FIG. 4A is a block diagram of an object file produced by a compiler according to a preferred embodiment of the present invention, in which object files are produced by the compiler with a UDS 406 to enable determination of conflicts between global register assignments by the static and run-time linkers. As shown in FIG. 4A, the object file 106 includes code and data 402, a symbol table 404, a relocation table 412, and a UDS 406 according to the present invention. The manner in which the compiler 104 generates such code and data 402, the symbol table 404, and the relocation table 412, will be apparent to persons skilled in the relevant art. In accordance with the present invention, the compiler 104 does not identify global symbol conflicts, or perform relocations. Instead, the compiler 104 generates global symbol and global register information 406, and embeds such information 406 in the object file 106. Such global symbol and global register information 406 includes information about global symbols and global registers defined and/or referenced in the source file 102, and includes additional information on how such global symbols and global registers are used by the source file 102. The global symbol and global register information is embodied in UDS 406 and is generated by the compiler 104 to enable the applicable linker 112 to identify global symbol conflicts and global register conflicts and to perform relocations to associate symbols with memory locations and global registers, as the case may be. The UDS 406 is further described below.

Figure 4B:
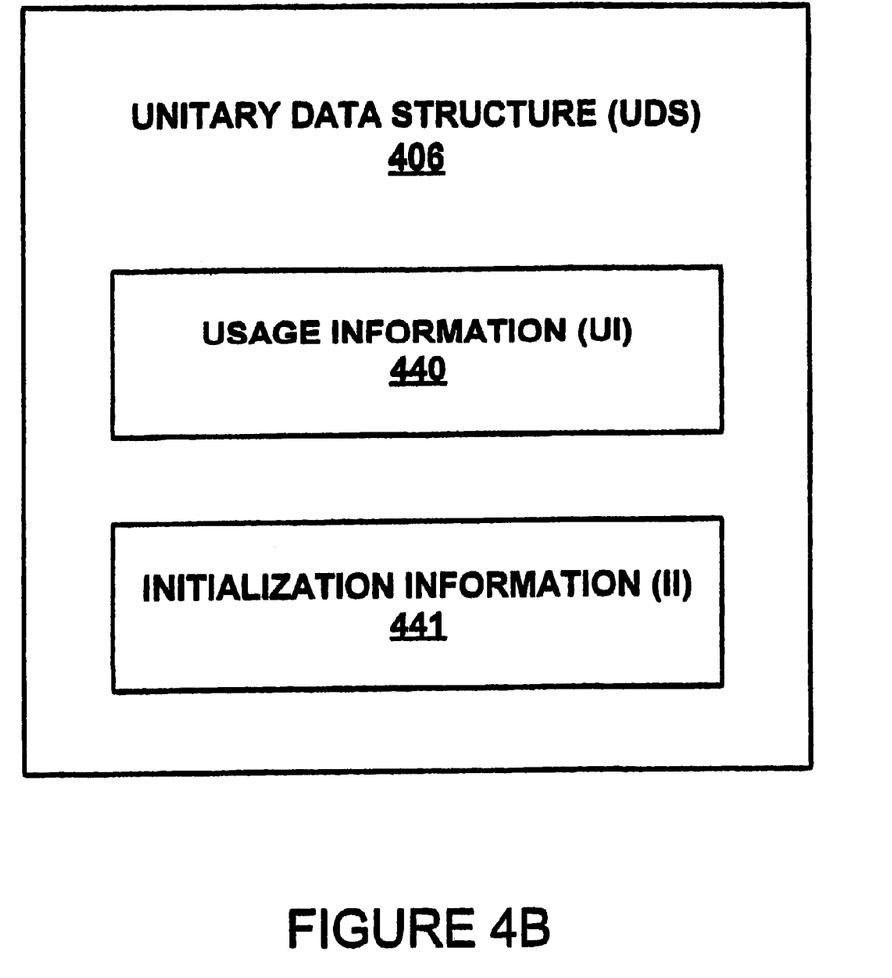
FIG. 4B is a block diagram of a UDS according to one embodiment of the present invention, including usage information and initialization information, to enable determination of conflicts between global register assignments by the static and run-time linkers.

FIG. 4B is a block diagram of a UDS 406 according to one embodiment of the present invention, including usage information (UI) 440 and initialization information(II) 441, to enable determination of conflicts between global register assignments by the static and run-time linkers. The UI 440 associates symbols with particular global registers.

Figure 4C:
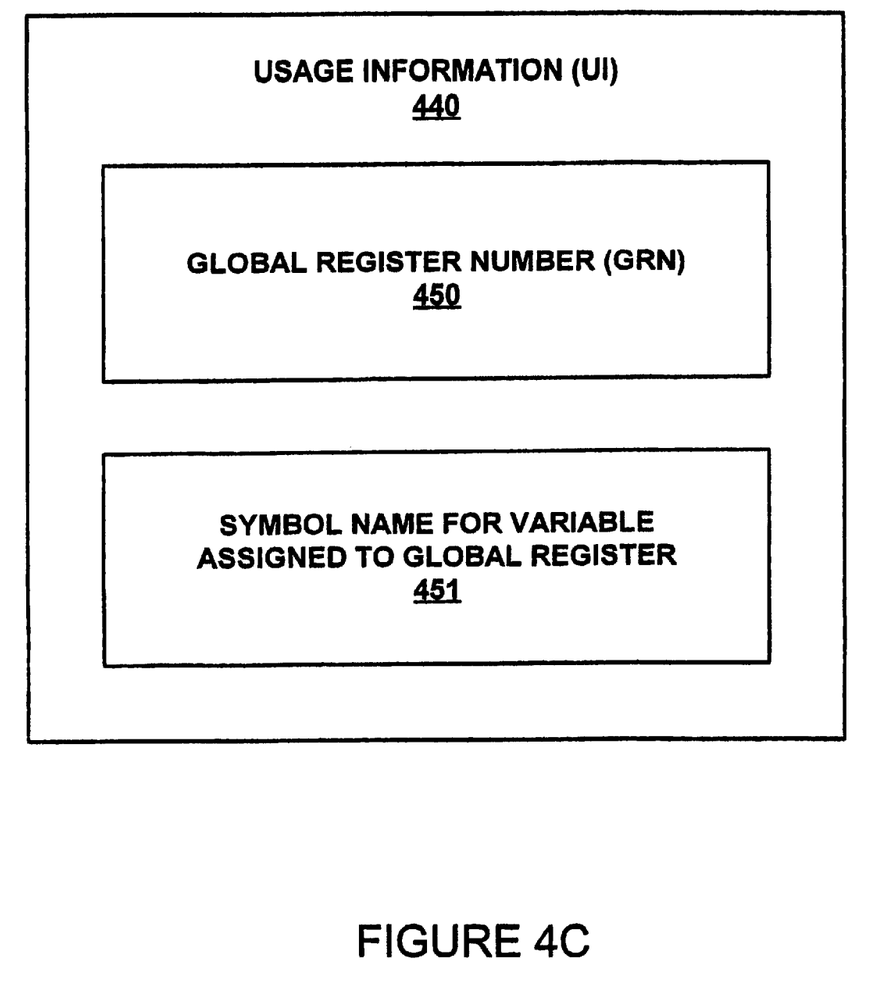
FIG. 4C is a block diagram of the protocol for usage information in a UDS according to the present invention.

FIG. 4C is a block diagram of the protocol for UI 440 in UDS 406 according to the present invention. In particular, the UI protocol includes a global register number (GRN) 450 and global symbol information (GSI) 451.

Figure 4D:
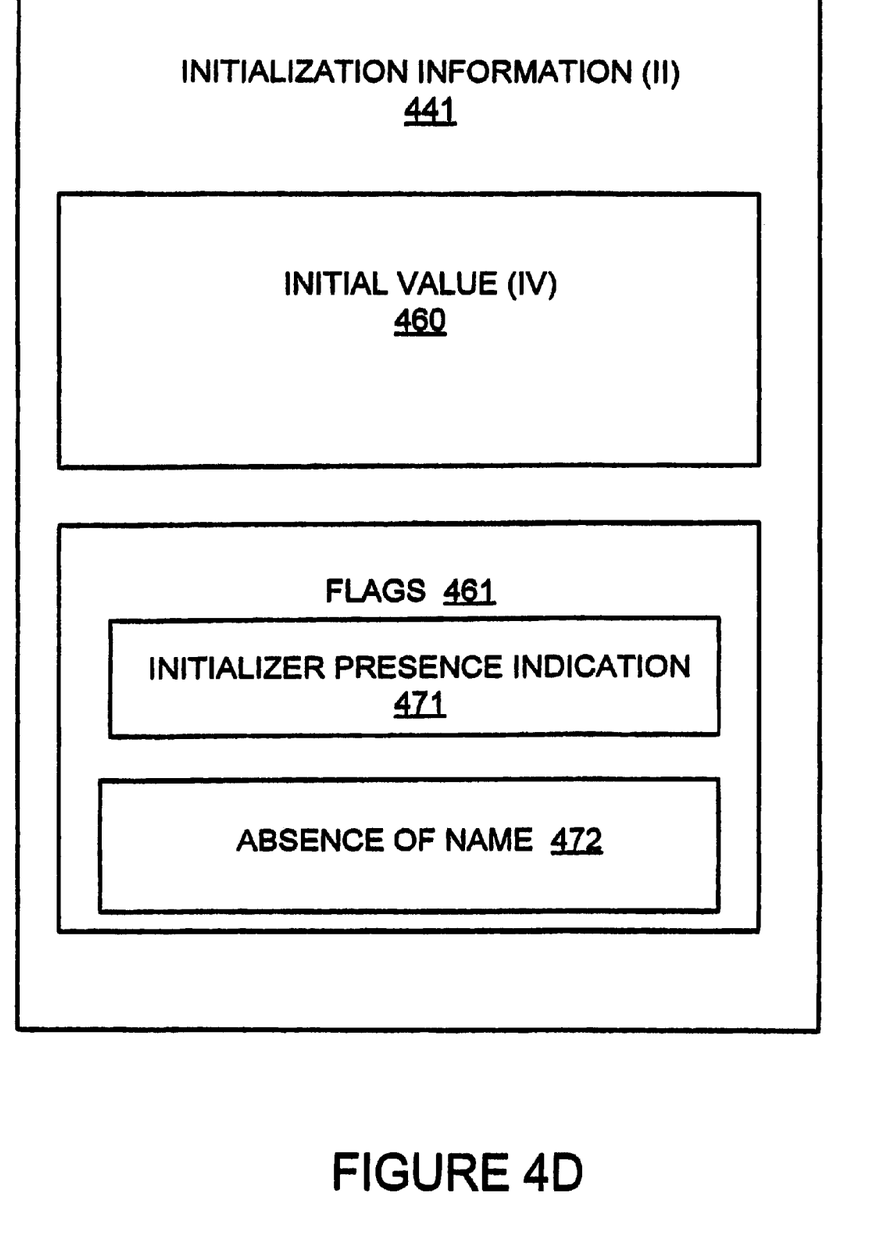
FIG. 4D is a block diagram of the protocol for initialization information in a UDS according to the present invention.

FIG. 4D is a block diagram of the protocol for II 441 in a UDS 406 according to the present invention. In particular, the II 441 includes an initial value (IV) for each global register, as well as flags 461 to provide an initializer presence indication 471 and an indication of the absence of a name 472. As discussed above, the compiler 104 does not identify global symbol conflicts or perform relocations. Instead, identification of global symbol conflicts is delayed from compile time to link time. In step 506 of FIG. 5, the compiler 104 generates information about global symbols and how they are used. Such information is called symbol information 406, and is embedded in the UDS 406 according to one embodiment of the present invention and in the object file 106 produced by the compiler 104.

Figure 5:
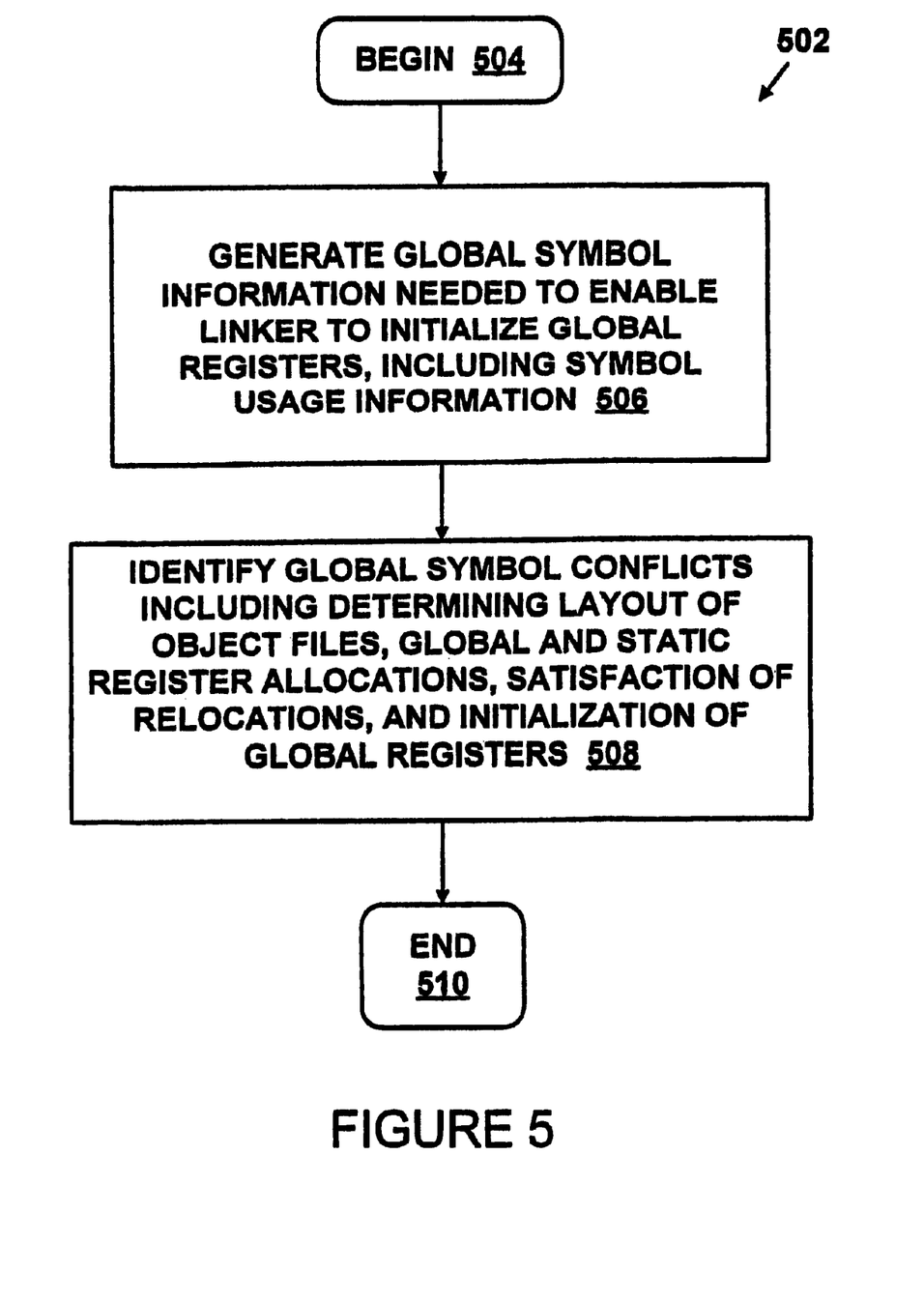
FIG. 5 is a flowchart of a compilation/linking process according to a preferred embodiment of the present invention.

FIG. 5 is a flowchart of a compilation/linking process according to a preferred embodiment of the present invention. More particularly, FIG. 5 is a flowchart of a compilation/linking process according to a preferred embodiment of the present invention. FIG. 5 depicts a flowchart 502 according to the present invention which represents the high-level operation of the compiler 104 and the applicable one of linkers 114, 118. The compiler 104 performs step 506 when compiling the source file 104, and the applicable one of linkers 114, 118 performs step 508 when processing the object files 106 and 108, and the shared libraries 110. Flowchart 502 begins with step 504, where control passes to step 506. The compiler generates global symbol table entries to indicate how the associated object file uses the application-reserved global registers. The programmer indicates to the compiler by flags, for example, according to another embodiment of the present invention, or to the assembler by flags or directives according to one embodiment of the present invention, what the global register usage is. In step 506, the compiler 104 generates an object file 106 from the source file 102. In step 508, the applicable one of linkers 114, 118 generates an executable file 116, and then an execution image 120 from the object files 106 and 108, and the shared libraries 110. As discussed above, during the generation of the executable file 116 and the execution image 120, the static linker 114 and the run-time linker 118 respectively each perform a read phase 306, a layout phase 308, a relocation phase 310, and a write phase 312. According to the present invention, these linker phases 306, 308, 310, and 312 are modified such that the static linker 114 and the run-time linker 118 identify global symbol conflicts and perform relocations. The operation of the static linker 114 and the run-time linker 118 is further discussed below. After step 508 is fully performed, the operation of flowchart 502 is complete, as indicated by step 510. The static linker 114 checks these symbol table entries in all the object files being combined into an executable file or shared library to ensure that the global registers are used compatibly. The resulting object includes, according to the present invention, entries in its symbol table to indicate the resulting object's global register usage. The static linker warns if any shared library that was referenced during the linking uses global registers in a fashion incompatible with the object being built. Further according to the present invention, the static linker generates a warning if a shared object is being built that uses application-reserved global registers. A similar warning is issued by an archiver, if an archive library is built containing objects that use application-reserved global registers. The dynamic linker according to the present invention checks that all object files being bound into the target process have compatible uses of the application-reserved global registers. A dlopen( ) of an object that is not compatible with the application process, for example, fails with an error.

TABLE B

Matrix of Usage Combinations for a Given Register

| Obj1\Obj2 | Unused | Scratch | Symbol |
|---|---|---|---|
| Unused | OK | OK | OK |
| Scratch | OK | OK | NO |
| Symbol | OK | NO | * |

*OK is used if the symbols are identical; NO is used if they are not identical. Two symbols are identical if and only if one of the following is true:
A. They are both global and have the same name.
B. They are both local, have the same name, and are defined in the same object.

The scratch symbol according to the present invention is treated as a symbol since a null name only matches a null name and scratch registers according to the present invention have global scope.

A matrix of legal combinations of st_shndx for the same register symbol follows:

TABLE C

Matrix of Legal Combinations of Initialization of a Given Register

| Obj1\Obj2 | UNDEF | ABS |
|---|---|---|
| UNDEF | OK | OK |
| ABS | OK | NO |

The symbol information 406 includes according to one embodiment of the present invention:
1. a symbol table 408 containing a list of global symbols; and
2. a relocation table 412 containing a list of global symbols.

Using the symbol information 406, the linker 114 or 118 as applicable in step 508 determines the exact layout of global symbol used by an application and then satisfies the relocations required. The symbol table 408 comprises a plurality of entries, where each entry corresponds to a symbol. These entries are used by the linkers 114 and 118 during the relocation process.

Figure 6:
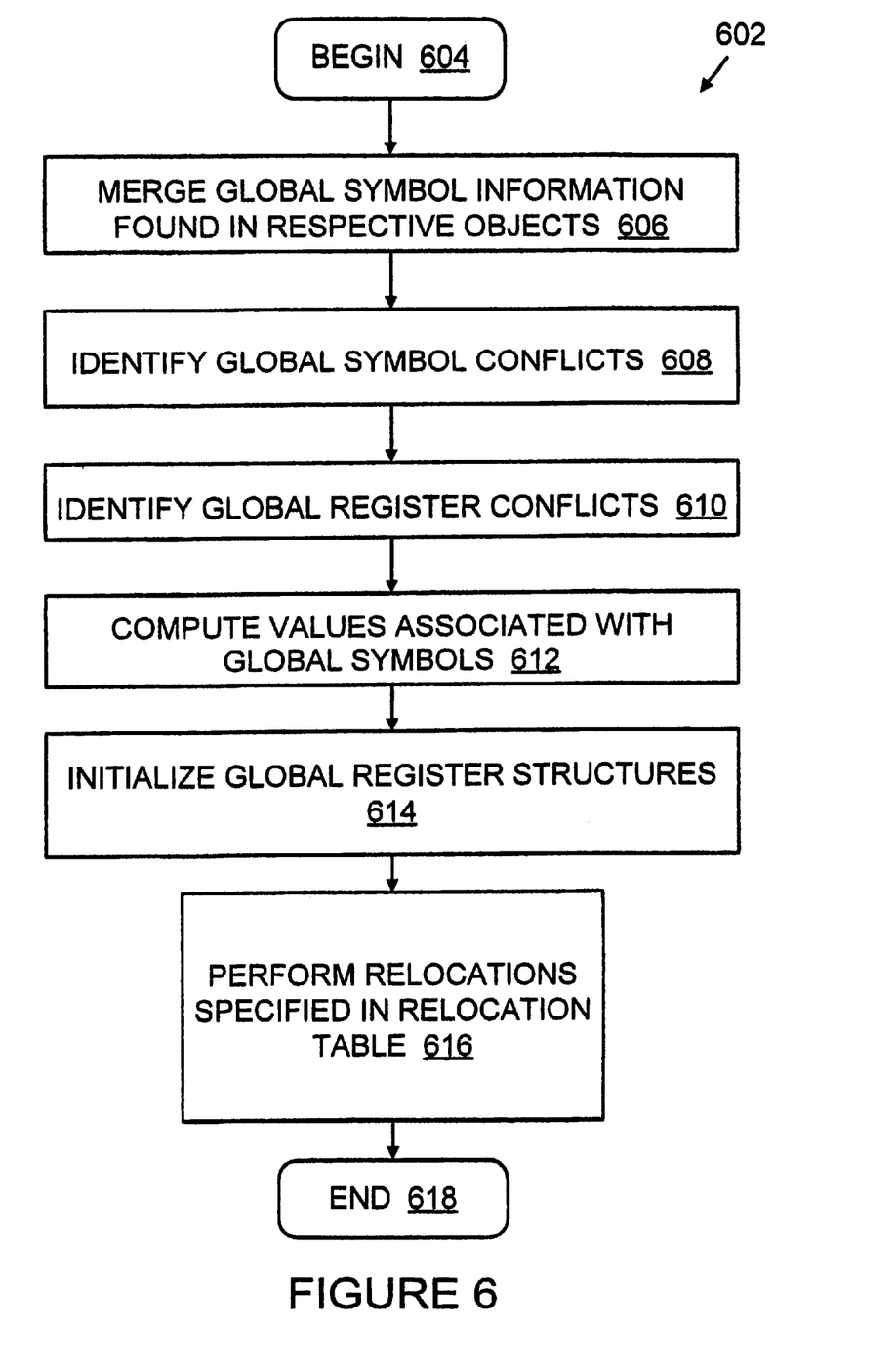
FIG. 6 is a detailed flowchart of link processing according to a preferred embodiment of the present invention.

FIG. 6 is a detailed flowchart of link processing according to a preferred embodiment of the present invention. FIG. 6 is a detailed flowchart of a linker which generally can be broken down into four phases: a read phase 306, a layout phase 308, a relocation phase 310, and a write phase 312 as noted above with respect to FIG. 3. According to the present invention, these linker phases 306, 308, 310, and 312 are restructured such that the applicable linker identifies global symbol conflicts based upon information contained in one or more of the unitary data structures (UDSS) 406. Such modifications are shown in a flowchart 602 which is represented in FIG. 6. In particular, step 606 is preferably performed in the read phase 306 in order to merge the global symbol information found in selected objects. Step 608 of the linker operation is preferably performed between the read phase 306 and the layout phase 308, accomplishing the identification of global register conflicts. Steps 612 and 614 are preferably performed between the layout phase 308 and the relocation phase 310 during operation of the applicable linker. Step 616 relates to relocations to modified memory addresses or global registers, and is preferably performed during the relocation phase 310. Flowchart 602 shall now be described in greater detail. Flowchart 602 particularly begins with step 604, where control immediately passes to step 606 to accomplish merger of global symbol information. In step 606, the applicable linker reads in the object files 106, 108 and the shared libraries 110 and merges together the global symbol information 406 contained in the UDS 406. Further, the applicable linker merges together the UDS 406 contained in these files to generate a merged UDS. Similarly, the applicable linker merges together the relocation tables 412 to generate a merged class relocation table. Next in step 608, the applicable linker identifies global symbol conflicts. In particular, the applicable linker processes the merged tables and determines the layout of each symbol (for example, the size and alignment of each symbol, the number of fields, the data types of the fields, the number of bytes from the top of the symbol to each of the fields, etc.). The applicable linker particularly creates a separate data structure for each symbol, and stores this symbol specific information in such separate data structures. These data structures are called "layout data structures" for reference purposes. Upon the completion of step 608, the applicable linker is aware of much of the symbol-related information produced by a compiler. According to step 610, global symbol conflicts are identified. In step 612, the applicable linker evaluates the symbols in the merged UDS. In particular, the applicable linker determines the value of the symbol in each entry of the merged symbol table, and stores this value in the value field of this entry. Consider, for example, the example UDS 406 in FIG. 4B. The applicable linker determines the values of particular entries by referencing an associated layout data structure. The applicable linker stores these values in the value fields of the entries of the UDS 406 which is contained in U1 440 of UDS 406. The manner in which the linker 112 calculates the values of other symbol types is described above. In step 614, the applicable linker initializes global register structures. In particular, during step 614 the applicable linker generates tables and table pointer information tables including UDSs 406, and stores these tables in the appropriate data structures that have been allocated. In step 616, the applicable linker performs the relocations specified in the entries of the merged relocation table. The manner in which the applicable linker performs this function is described above. After step 616 is fully performed, the operation of flowchart 602 is complete, as indicated by step 618. As will be appreciated by persons skilled in the relevant art, the operation of the applicable linker described above is, in practice, collectively performed by the static linker 114 and the run-time linker 118. Whether the operations described above are performed by the static linker 114 or the run-time linker 118 is not important in the present invention. Preferably, however, the static linker 114 attempts to prelink executables and shared objects so that if the executable and shared objects are in the same state as when they were created, then the run-time linker 118 needs to only load the files and start running. In practice, the run-time linker 118 may have to redo many of the relocations that were done by the static linker 114.

Figure 7:
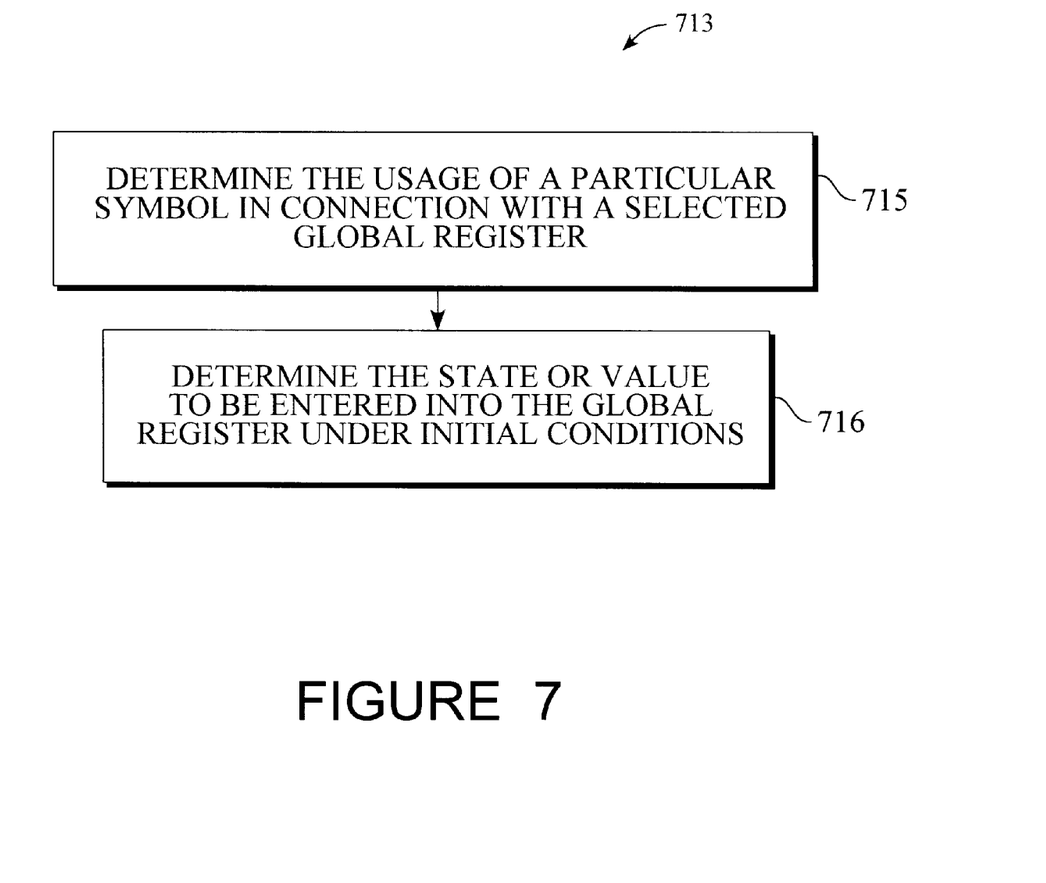
FIG. 7 is a flowchart of operation of a unitary data structure (UDS) generated by a compiler according to a preferred embodiment of the present invention.

FIG. 7 is a flowchart of operation according to the present invention in which a unitary data structure (UDS) 406 which has been generated by a compiler according to a preferred embodiment of the present invention, in which a symbol which has been defined in a symbol table is associated with a global register, and a particular value is provided in the UDS 406 to initialize the particular global register. FIG. 7 is an example of the use of a unitary data structure generated by a compiler according to a preferred embodiment of the present invention. The flowchart according to FIG. 7 shows first and second steps, respectively 715 and 716. The method of the present invention uses information that identifies the symbol type, and information that indicates the value of the symbol for this class. The information for particular symbols such as additional fields and a symbol name. The symbol name when appropriate contains the name of a member. The list of symbol types is implementation specific, and depends on a number of factors, such as the computer programming language and the target machine. Example symbol types will be apparent to persons skilled in the relevant art. As described below, the applicable linker calculates the values of the symbols referred to in the UDS 406 according to the present invention before processing the relocation entries in the relocation table 412. In processing each relocation entry, the value is extracted from the symbol table and is stored at the given address according to the type of the relocation entry. In particular, processing is undertaken to determine the relocation entries in the relocation table 412, the applicable linker evaluates the symbol entries in the UDS 406. The applicable linker inserts a particular value into the value field of the symbol entry. According to the present invention, the applicable linker inserts this value (8 bytes) into the value field of the symbol entry. While processing includes data relocation entry, the applicable linker replaces according to the present invention a placeholder in the instruction at a particular address with a value in symbol entry. This is the case pointer in relocation entry points to symbol entry. Similarly, while processing relocation entry, the applicable linker replaces the 0 in the instruction at a particular address with the value in symbol entry. While processing relocation entry, the applicable linker replaces the value in the instruction at a particular address with the value in symbol entry. A register symbol in a UDS 406 according to one embodiment of the present invention is indicated by a specific Symbol Type:

TABLE D

Additional Symbol Table Type

| Name | Value |
|---|---|
| STT_REGISTER | 13 |

A symbol table entry for a register symbol according to one embodiment of the present invention includes:

| | |
|---|---|
| st_name | Index into the string table of the name of the symbol. An index value of 0, which points to the null name in the string table, indicates that the register is used for scratch. A scratch register must have binding STB_GLOBAL. |
| st_value | Register number. Register numbers correspond to the assignments in the SPARC Architecture Manual for integer registers. |
| st_size | unused (0) |
| st_info | ELF64_ST_INFO (bind.type) bind is typically STB_GLOBAL, but does reflect the actual declared scope of the name (that is, it could be STB_WEAK or STB_LOCAL). type must be STT_REGISTER (13) |
| st_other | unused (0) |
| st_shndx | SHN_ABS if this object initializes this register symbol; SHN_UNDEF otherwise. An initializer for a SHN_ABS register symbol is specified with a special register relocation type. |

Absence of an entry for a particular global register means that particular global register is not used by the object. An object according to the present invention uses one or more of the application-reserved global registers and indicates this usage with an appropriate symbol-table entry. For example, the following dynamic array tag is added to the symbol table according to one embodiment of the present invention:

TABLE E

Symbol Table Dynamic Array Tags

| Name | Value | d_un | Executable | Shared Object |
|---|---|---|---|---|
| DT_REGISTER | 0x7000001 | d_val | optional | optional |
| DT_REGISTER | This element contains the index of an STT_REGISTER symbol. There is one of these entries for every STT_REGISTER symbol table entry in the symbol table. | | | |

The compiler 104 generates code that is relocated at link-time. If a variable is referenced in a source file, the compiler 104 according to the present invention generates a unitary data structure 406, a symbol table 408, and a relocation table 412. The unitary data structure according to the present invention specifies the initialization value for each applicable global register, and contains information which relates particular symbols with a particular global register, permitting each applicable linker to associate the symbol and register to which it relates. The applicable linker which implements the association between symbol and global register based upon information in the unitary data structure, then checks for symbol conflicts based upon multiple symbol assignment to the same global register.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of compiling and linking a source file, the method comprising:

generating, using a compiler, global variable information pertaining to at least one global variable referenced in a source file;

generating, using the compiler, a first object file from the source file, where the object file includes global variable information;

linking the first object file with at least a second object file to generate an executable file;

generating, during the linking process, a composite symbol table having a symbol entry for each global variable in at least one of the linked object files;

examining, during the linking process, the composite symbol table and determining if at least one global variable conflict occurs;

generating, during or after the linking process, a composite relocation table having at least one relation entry for resolving at least one global variable conflict determined during examination of the composite symbol table;

performing, during or after the linking process, a relocation operation according to at least one relocation entry in the composite relocation table; and completing compilation of the first and second object files after the linking process and the relocation operation are completed.

2. The method of claim 1, further comprising initializing, during said linking process, at least one global register for said at least one global variable.

3. The method of claim 2, further comprising initializing said at least one global register to a desired initial value before execution of said executable file.

4. The method of claim 2, further comprising providing an incompatibility indication, during said linking process, when said first object file uses at least one of said at least one global register in a manner that is incompatible with said second object file.

5. The method of claim 1, further comprising:

providing an archiver to construct an archive library;

providing a reservation indication, during said linking process, when the archive library being constructed uses at least one application-reserved global register.

6. The method of claim 1, further comprising identifying at least one usage conflict and performing said relocation operation after said linking process is completed.

7. The method of claim 1, further comprising calculating, using said linker process, at least one value of a symbol in a symbol table before performing said relocation operation.

8. A system for compiling and linking a source file, the system comprising:

a compiler having a first compiler mechanism for generating global variable information pertaining to at least one global variable reference in a source file, and having a second compiler mechanism for producing a first object file, which contains the global variable information; and a linker mechanism for linking the first object file with a second object file to generate a combined executable file, the linker mechanism further comprising:

a first mechanism for generating a composite symbol table having a symbol entry for at least one global variable in the linked object files;

a second mechanism for examining the composite symbol table and for determining if at least one global variable conflict occurs;

a third mechanism for generating a composite relocation table for resolving at least one global variable conflict, when at least one global variable conflict is detected; and a fourth mechanism for performing, during or after the time the first and second object files are linked, at least one relocation operation according to at least one relocation entry in the relocation table, where compilation of the first and second object files is completed after the first and second object files are linked and the relocation operation is performed.

9. The system of claim 8, wherein said linker mechanism further comprises a register initialization mechanism for initializing at least one global register for said at least one global variable before performance of said at least one relocation operation.

10. The system of claim 9, wherein said linker mechanism initializes said at least one global register to a desired initial value before execution of said executable file.

11. The system of claim 9, wherein said linker mechanism comprises:

an incompatibility mechanism for providing an incompatibility indication, during said linking process, when said first object file uses at least one of said global registers in a manner that is incompatible with said second object file.

12. The system of claim 8, further comprising:

an archiver to construct an archive library and to provide a reservation indication, during said linking process, when the archive library being constructed uses at least one application-reserved global register.

13. The system of claim 8, wherein said linker mechanism indentifies at least one usage conflict for said at least one global variable and perform said relocation operation after said linking process is completed.

14. The system of claim 8, wherein said linker mechanism calculates at least one value of a symbol in said composite symbol table before performing said relocation operation.

* * * * *